(12) United States Patent
Wijmans et al.

(10) Patent No.: US 8,246,718 B2
(45) Date of Patent: *Aug. 21, 2012

(54) PROCESS FOR SEPARATING CARBON DIOXIDE FROM FLUE GAS USING SWEEP-BASED MEMBRANE SEPARATION AND ABSORPTION STEPS

(75) Inventors: Johannes G. Wijmans, Menlo Park, CA (US); Richard W. Baker, Palo Alto, CA (US); Timothy C. Merkel, Menlo Park, CA (US)

(73) Assignee: Membrane Technology and Research, Inc, Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/123,342

(22) PCT Filed: Sep. 13, 2010

(86) PCT No.: PCT/US2010/002481
§ 371 (c)(1),
(2), (4) Date: Apr. 8, 2011

(87) PCT Pub. No.: WO2012/036652
PCT Pub. Date: Mar. 22, 2012

(65) Prior Publication Data
US 2011/0262328 A1    Oct. 27, 2011

(51) Int. Cl.
*B01D 53/22* (2006.01)

(52) U.S. Cl. .................. 95/51; 95/43; 96/4

(58) Field of Classification Search ....... 95/51; 96/4–14
See application file for complete search history.

(56) References Cited

U.S. PATENT DOCUMENTS

| 4,376,102 | A | * | 3/1983 | Thaler et al. ............ 423/223 |
|---|---|---|---|---|
| 4,931,070 | A | | 6/1990 | Prasad |
| 4,963,165 | A | | 10/1990 | Blume et al. |
| 5,034,126 | A | | 7/1991 | Reddy et al. |
| 5,240,471 | A | | 8/1993 | Barbe et al. |
| 5,500,036 | A | | 3/1996 | Kalthod |
| 5,641,337 | A | | 6/1997 | Arrowsmith et al. |
| 5,681,433 | A | | 10/1997 | Friesen et al. |
| 5,843,209 | A | | 12/1998 | Ray et al. |
| 6,478,852 | B1 | | 11/2002 | Callaghan |
| 7,964,020 | B2 | * | 6/2011 | Baker et al. ............ 95/51 |
| 7,981,196 | B2 | * | 7/2011 | Kang et al. ............ 95/183 |

(Continued)

FOREIGN PATENT DOCUMENTS

WO    WO 2009139835 A1 * 11/2009

OTHER PUBLICATIONS

US 4,981,498, 01/1991, Bikson et al. (withdrawn)

*Primary Examiner* — Jason M Greene
*Assistant Examiner* — Anthony Shumate
(74) *Attorney, Agent, or Firm* — K Bean; J. Farrant (57) ABSTRACT

A gas separation process for treating flue gases from combustion processes, and combustion processes including such gas separation. The invention involves routing a first portion of the flue gas stream to be treated to an absorption-based carbon dioxide capture step, while simultaneously flowing a second portion of the flue gas across the feed side of a membrane, flowing a sweep gas stream, usually air, across the permeate side, then passing the permeate/sweep gas to the combustor.

20 Claims, 6 Drawing Sheets

U.S. PATENT DOCUMENTS

| | | | |
|---|---|---|---|
| 8,025,715 B2 * | 9/2011 | Wijmans et al. | 95/51 |
| 8,034,168 B2 * | 10/2011 | Wijmans et al. | 96/4 |
| 2010/0037772 A1 * | 2/2010 | Roe et al. | 95/42 |
| 2010/0236404 A1 | 9/2010 | Baker et al. | |
| 2011/0200491 A1 * | 8/2011 | Wijmans et al. | 422/169 |
| 2011/0219949 A1 * | 9/2011 | Wijmans et al. | 95/39 |
| 2011/0239700 A1 * | 10/2011 | Hasse et al. | 62/617 |
| 2011/0260112 A1 * | 10/2011 | Wijmans et al. | 252/372 |

* cited by examiner

FIG. 1

FIG. 2
(not in accordance with invention)

FIG. 3
(not in accordance with invention)

FIG. 4
(not in accordance with invention)

FIG. 5
(not in accordance with invention)

FIG. 6

PROCESS FOR SEPARATING CARBON DIOXIDE FROM FLUE GAS USING SWEEP-BASED MEMBRANE SEPARATION AND ABSORPTION STEPS

This invention was made in part with U.S. Government support under SBIR Award No. DE-NT-000-5312, awarded by the U.S. Department of Energy. The U.S. Government has certain rights in this invention.

The present application claims priority to PCT Application Serial No. PCT/US2010/002481, filed Sep. 13, 2010.

FIELD OF THE INVENTION

The invention relates to membrane-based gas separation processes, and specifically to processes using a sweep gas on the permeate side of the membranes to remove carbon dioxide from flue gas. In particular, the invention concerns the use of sweep-based membrane separation in conjunction with absorption to capture carbon dioxide.

BACKGROUND OF THE INVENTION

Many combustion processes produce flue gases contaminated with carbon dioxide that contribute to global warming and environmental damage.

Such gas streams are difficult to treat in ways that are both technically and economically practical, and there remains a need for better treatment techniques.

Gas separation by means of membranes is a well established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

The use of a process including a membrane separation step operated in sweep mode for treating flue gas to remove carbon dioxide is taught in co-owned and copending patent application Ser. No. 12/734,941, filed Jun. 2, 2010.

SUMMARY OF THE INVENTION

The invention is a process involving membrane-based gas separation for controlling carbon dioxide emissions from combustion processes, and combustion processes in which carbon dioxide emissions are so controlled. In particular, the invention includes three steps: a combustion step, a sweep-based membrane separation step, and an absorption step, the membrane separation and absorption steps being performed in parallel.

Combustion exhaust streams or off-gases are typically referred to as flue gas, and arise in large quantities from ovens, furnaces, heaters, and boilers in all sectors of industry. In particular, power plants generate enormous amounts of flue gas. A modestly sized 100 megawatt coal-based power plant may produce over 300 MMscfd of flue gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. The carbon dioxide concentration in the flue gas is generally up to about 20 vol %.

In addition to gaseous components, combustion flue gas contains suspended particulate matter in the form of fly ash and soot. This material is usually removed by several stages of filtration before the gas is sent to the stack. It is assumed herein that the flue gas has already been treated in this way, if desired, prior to carrying out the processes of the invention.

The process of the invention involves treating the exhaust or flue gas to remove carbon dioxide. In preferred embodiments, the carbon dioxide level of the exhaust gas is reduced to as low as 5 vol % or less, and most preferably to 3 vol % or less. Discharge of such a stream to the environment is much less damaging than discharge of the untreated exhaust.

The combustion process from which the exhaust is drawn may be of any type. The fuel may be a fossil fuel, such as coal, oil, or natural gas, or may be from any other source, such as syngas, landfill gas, biomass, or other combustible waste. The fuel may be combusted by mixing with air, oxygen-enriched air, or pure oxygen.

After the combustion step itself, a first portion of the flue gas is subjected to an absorption-based carbon dioxide capture step. The carbon dioxide capture step is preferably performed using amine scrubbing (which will be discussed in the "Detailed Description", below). This capture step removes a portion of the carbon dioxide from the emissions stream, and preferably provides it in the form of a concentrated stream, such as greater than 60, 70, or 80 vol % carbon dioxide, and most preferably as a supercritical fluid or liquid high purity product. The concentrated carbon dioxide product stream may be sent for sequestration, or for any other use.

The vented exhaust stream from the capture step still contains carbon dioxide, but normally at a lower concentration than the raw exhaust stream. Typically, this concentration is up to about 10 vol % carbon dioxide.

A second portion of the flue gas is sent for treatment in a membrane separation unit. The unit contains membranes selectively permeable to carbon dioxide over nitrogen, and to carbon dioxide over oxygen. It is preferred that the membrane provide a carbon dioxide permeance of at least about 300 gpu, more preferably at least about 500 gpu, and most preferably at least about 1,000 gpu under the operating conditions of the process. A carbon dioxide/nitrogen selectivity of at least about 10, or more preferably 20, under the operating conditions of the process is also desirable.

The off-gas flows across the feed side of the membranes, and a sweep gas of air, oxygen-enriched air, or oxygen flows across the permeate side, to provide or augment the driving force for transmembrane permeation.

The sweep stream picks up the preferentially permeating carbon dioxide. The sweep/permeate stream is then withdrawn from the membrane unit and is returned to the combustor to form at least part of the air, oxygen-enriched air, or oxygen feed to the combustion step.

By using the oxygen-containing stream destined for the combustor as sweep gas, the membrane separation step is carried out in a very efficient manner, and without introducing any additional unwanted components into the combustion zone.

The process is particularly useful in applications that are energy-sensitive, as is almost always the case when the very large streams from power plants and the like are to be processed.

The process is also particularly useful in separations that are pressure-ratio limited, as will be explained in more detail below.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, concurrent.

The residue stream is reduced in carbon dioxide content to less than about 5 vol %, more preferably to less than 3 vol %, and most preferably to less than 2 vol %. This stream is typically, although not necessarily, discharged to the environment. The substantial reduction of the carbon dioxide content in the raw exhaust greatly reduces the environmental impact of discharging the stream.

The invention in a basic embodiment includes three steps: a combustion step, an absorption-based carbon dioxide capture step, and a sweep-based membrane separation step, where the carbon dioxide capture step and the sweep-based membrane separation step are performed in parallel. That is, a portion of the exhaust stream from the combustion process is routed to a sorption-based carbon dioxide capture step, and the other portion is routed to a sweep-based membrane separation step.

A basic embodiment of a process of this type includes the following steps:
(a) performing a combustion process by combusting a mixture of a fuel and air, oxygen-enriched air, or oxygen, thereby creating an exhaust stream comprising carbon dioxide and nitrogen;
(b) performing an absorption-based carbon dioxide capture step to remove a portion of carbon dioxide in concentrated form from a first portion of the exhaust stream;
(c) providing a membrane having a feed side and a permeate side, and being selectively permeable to carbon dioxide over nitrogen and to carbon dioxide over oxygen;
(d) passing a second portion of the exhaust stream across the feed side;
(e) passing air, oxygen-enriched air, or oxygen as a sweep stream across the permeate side;
(f) withdrawing from the feed side a carbon dioxide-depleted vent stream;
(g) withdrawing from the permeate side a permeate stream comprising oxygen and carbon dioxide;
(h) passing the permeate stream to step (a) as at least part of the air, oxygen-enriched air, or oxygen used in step (a).

An objective of the invention is to substantially increase the concentration of carbon dioxide in the exhaust stream from the combustor or boiler, so that the portion of the exhaust stream that is sent to the absorption-based carbon dioxide capture step can itself be concentrated and captured more efficiently than would otherwise be possible. This is achieved by returning the carbon dioxide-enriched permeate stream from the membrane separation step to the combustor. The exhaust stream preferably comprises at least 15 vol % $CO_2$; more preferably, at least 20 vol % $CO_2$; and, most preferably, at least 25 vol % $CO_2$ If the gas needs to be transported to reach the equipment that carries out the carbon dioxide capture step, such as an amine plant, transportation of the carbon dioxide enriched exhaust gas is far simpler and less costly than transporting low concentration raw flue gas from a conventional power plant. Typically, the amount of gas that must be pipelined or otherwise transported to the carbon dioxide capture plant is reduced several fold, such as to 50%, 30%, or even 25% or less of the amount that would need to be sent if the membrane separation step were absent. This is a significant benefit of the invention.

The portion of the exhaust stream that is sent to the carbon dioxide capture step (i.e., the "first portion") preferably comprises between about 10 vol % and about 75 vol %. This can also be expressed as a split ratio, where the ratio defines the relative proportions of the flue gas sent to the carbon dioxide capture step and the membrane separation step. In general, therefore, we prefer to operate with a split ratio of between 1:10 and 3:1.

The other ("second") portion of the exhaust stream is sent to a sweep-based membrane separation step. The second portion of the exhaust stream may be sent to the membrane unit without compression, or may be compressed. Slight compression to a pressure from between about 1.5 bar up to about 5 bar, such as 2 bar, is preferred. The sweep stream preferably follows a sweep flow direction across the permeate side, the off-gas stream follows a feed flow direction across the feed side, and the sweep flow direction is substantially countercurrent to the feed flow direction. The membrane preferably exhibits a carbon dioxide permeance of at least 500 gpu, and a selectivity in favor of carbon dioxide over nitrogen of at least 10, under process operating conditions.

Another objective of the invention is to minimize the amount of $CO_2$ in the vent stream, which is often released directly to the environment. As such, the vent stream preferably comprises less than 5 vol % $CO_2$; more preferably, less than 4 vol % $CO_2$; and, most preferably, less than 3 vol % $CO_2$.

DETAILED DESCRIPTION OF THE INVENTION

Gas percentages given herein are by volume unless stated otherwise.

Pressures as given herein are in bar absolute unless stated otherwise.

The terms exhaust gas, off-gas, flue gas, and emissions stream are used interchangeably herein.

The terms absorption, sorption, and scrubbing are used interchangeably herein.

The invention is a process for controlling carbon dioxide emissions from combustion processes by membrane-based gas separation, and combustion processes including such gas separation. The invention incorporates three unit operations: a combustion step, an absorption-based carbon dioxide capture step, and a sweep-based membrane separation step, where the carbon dioxide capture step and the sweep-based membrane separation step are performed in parallel. The process achieves good efficiency and performance by integrating the membrane separation step with the combustion step, thereby providing a relatively high-concentration feed to the absorption or scrubbing step to capture the carbon dioxide.

Figure 1:
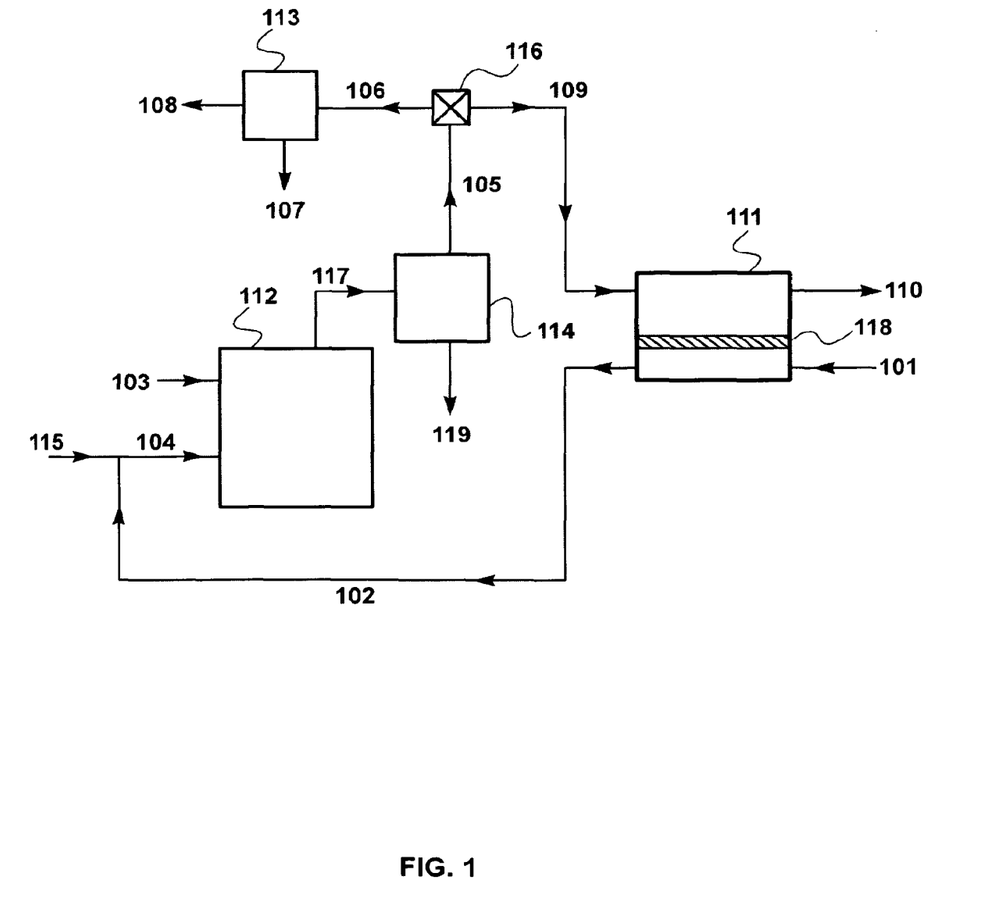
FIG. 1 is a schematic drawing of a flow scheme for a basic embodiment of the invention as it relates to a typical combustion process.

A simple flow scheme for a preferred embodiment of the invention is shown in FIG. 1. From FIG. 1, it may be seen that a portion of the exhaust stream from the combustion process is routed to the absorption-based carbon dioxide capture step, and the other portion is routed to the sweep-based membrane separation step.

Referring to FIG. 1, fuel stream 103 and air, oxygen-enriched air, or oxygen stream 104 are introduced into combustion step or zone 112. Stream 104 is made up of sweep stream 102 (discussed below) and, optionally, additional air or oxygen supply stream 115. The process may be carried out at atmospheric pressure or at elevated pressure.

The combustion step may be carried out in any way limited only in that it results in an off-gas, exhaust gas or flue gas containing carbon dioxide. Such combustion processes occur throughout industrialized society. Representative processes include those in which the combustion step is used to provide heat for an oven or furnace, such as a blast furnace or rotary kiln, for example, a lime or cement kiln. Other important processes are those in which the combustion step is used to generate steam to operate a turbine or other equipment to perform mechanical work or generate electric power. In yet other processes, the combustion gases themselves are used as a source of power to drive a turbine or the like, and may be treated before or after they have been used in the turbine. Further examples of combustion processes are those used to supply heat for refinery operations, such as certain types of cracking or reforming.

The fuel for the combustion step may be any fuel that can be combusted with oxygen, including, but not limited to, coal, coke, wood, biomass, solid wastes, oils, and other natural and synthetic liquid fuels of all grades and types, and hydrocarbon-containing gas of any type, such as natural gas, syngas, landfill gas, coal mine gas, or the like.

The oxygen with which the fuel is combusted may be supplied in the form of high purity oxygen, oxygen-enriched air, normal air, or any other suitable oxygen-containing mixture.

Combustion exhaust stream 117—preferably containing at least 15 vol %; more preferably, at least 20 vol %; and, most preferably, at least 25 vol %, carbon dioxide—is withdrawn. This stream usually contains at least carbon dioxide, water vapor, nitrogen, and oxygen, as well as the other components mentioned in the Summary section above. Combustion exhaust stream 117 is optionally but typically routed through a condenser 114, where the stream is cooled, knocking out excess water 119. The dehydrated exhaust stream 105 is then routed through a splitter 116, where it is divided in a desired ratio into a first portion 106 and a second portion 109.

The first portion 106 of exhaust stream 105 is routed to an absorption-based carbon dioxide capture step 113, which yields a concentrated carbon dioxide product stream, 107, preferably containing greater than 60, 70, or 80 vol % carbon dioxide or more. This stream may be in the gas or liquid phase, or may be a supercritical fluid. The concentrated stream 107 may be sent for further processing in a sequestration step (not shown) to yield a liquid carbon dioxide product, for example, but alternatively may be used or disposed of in any other appropriate way. The remaining exhaust stream 108 is nitrogen-rich and is typically vented to the environment.

The absorption step may be carried out in any manner, and using any sorbent, that enables the bulk of the carbon dioxide to be removed from the first portion of exhaust gas. Preferably the absorption step is performed by amine scrubbing, which has been used to separate carbon dioxide from natural gas and hydrogen since the 1930's. The technology, which involves absorption of carbon dioxide into an aqueous amine solution, followed by regeneration of the solution by stripping, is a well-understood and widely used process. The basic process was patented by R. R. Bottoms in 1930, under U.S. Pat. No. 1,783,901, the disclosure of which is hereby incorporated by reference in its entirety.

Carbon dioxide is absorbed from a fuel gas or combustion gas near ambient temperature into an aqueous solution of amine with low volatility. The amine sorbent may include a single alkanolamine or a mixture of amines. The sorbent solution may be regenerated by steam stripping, and the carbon dioxide recovered from the stripping vapor by cooling and condensing the water. A representative process of this type that may be used is the Fluor Daniel Econamine FG™ process, which uses a monoethanolamine (MEA) based sorbent system. Very detailed descriptions of such processes can be found in the literature, for example in *Gas Purification*, A. Kohl and R. Nielsen (Fifth Edition, Gulf Publishing Co., Houston, Tex., 1997), pages 1188-1237.

As one possible representative alternative to amine scrubbing, an absorption process using chilled ammonia may be used. In such a process, the flue gas is first cooled to condense and remove moisture and residual pollutants before it enters the carbon dioxide absorber. There, the carbon dioxide is absorbed by an ammonia-based solution, separating it from the flue gas.

Another possible alternative to amine absorption is absorption with potassium carbonate, sometimes called the Benfield process or the "Hot Pot" process. These systems are known as "activated hot potassium carbonate" (AHPC) systems. In this process, cool potassium carbonate reacts with carbon dioxide to form potassium bicarbonate. When the solution is heated in a desorption tower, the absorbed carbon dioxide is released.

Other alternative processes include the Rectisol® and Selexol® processes, both of which are well known in the chemical engineering industry. Rectisol and Selexol are trade names for solvents that separate acid gases, such as carbon dioxide and hydrogen sulfide, by physical sorption. Since no chemical reactions are involved, these processes typically require less energy than amine- or ammonia-based processes.

Rectisol uses a methanol solvent and has commonly been used to treat syngas produced by gasification of coal or heavy hydrocarbons, as the solvent can remove trace contaminants—such as ammonia, mercury, and hydrogen cyanide—typically found in these gases.

In the Rectisol process, cold methanol at approximately −40° F. (−40° C.) dissolves/absorbs the acid gases from the feed gas at relatively high pressure, usually 400 to 1,000 psia (2.76 to 6.89 Mpa). The acid gas-rich solvent is then reduced in pressure to release and recover the acid gases. The Rectisol process can operate selectively to recover carbon dioxide and hydrogen sulfide as separate streams.

The Selexol solvent is a mixture of the dimethyl ethers of polyethylene glycol. The Selexol process also operates under pressure, typically around 300 to 2000 psia (2.07 to 13.8 Mpa). Like the Rectisol process, the acid gas-rich solvent is then reduced in pressure and/or steam-stripped to release and recover the acid gases, which can be selectively recovered as separate streams.

If desired, amine scrubbing or other sorption may be combined in this step with one or more other known gas separation technologies. Examples of such technologies include, but are not limited to, membrane separation, compression/low temperature condensation, and adsorption.

Concurrently with the carbon dioxide capture step, a second portion, 109, of combustion exhaust stream, 105, is sent for treatment in sweep-based membrane separation step or unit, 111. The membrane separation unit, 111, contains membranes, 118, that exhibit high permeance for carbon dioxide, as well as high selectivity for carbon dioxide over nitrogen.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of membranes are known to have high carbon dioxide/nitrogen selectivity, such as 30, 40, 50, or above, although the selectivity may be much lower under actual operating conditions. A representative preferred material for the selective layer is Pebax®, a polyamide-polyether block copolymer material described in detail in U.S. Pat. No. 4,963,165. We have found that membranes using Pebax® as the selective polymer can maintain a selectivity of 10 or greater under process conditions.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules, and potted hollow fiber modules. The making of all these types of membranes and modules is well known in the art. To provide countercurrent flow of the sweep gas stream, the modules preferably take the form of hollow fiber modules, plate-and-frame modules, or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit, 111, may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multi-stage, multi-step, or more complicated arrays of two or more units in serial or cascade arrangements.

Although the membrane modules are typically arranged horizontally, a vertical configuration may in some cases be preferred in order to reduce the risk of deposition of particulates on the membrane feed surface.

The separation of components achieved by the membrane unit depends not only on the selectivity of the membrane for the components to be separated, but also on the pressure ratio. By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure ratio-limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 101, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate side to a level below its partial pressure on the feed side. The use of the sweep gas stream 101 maintains a low carbon dioxide partial pressure on the permeate side, thereby providing driving force.

The partial pressure on the permeate side may be controlled by adjusting the flow rate of the sweep stream to a desired value. In principle, the ratio of sweep gas flow to feed gas flow may be any value that provides the desired results, although the ratio of sweep gas flow:feed gas flow will seldom be less than 0.5 or greater than 10. High ratios (that is, high sweep flow rates) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rates) achieve high concentrations of carbon dioxide in the permeate, but relatively low levels of carbon dioxide removal from the feed.

Use of a too low sweep flow rate may provide insufficient driving force for a good separation, and use of an overly high sweep flow rate may lead to pressure drop or other problems on the permeate side, or may adversely affect the stoichiometry in the reaction vessel. Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force for permeation is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient, as shown in the examples below.

Returning again to FIG. 1, the second portion 109 of combustion exhaust stream 105 flows across the feed side of the membranes; a sweep gas of air, oxygen-enriched air, or oxygen stream 101, flows across the permeate side. The sweep stream picks up the preferentially permeating carbon dioxide, and the resulting permeate stream 102 is withdrawn from the membrane unit and is combined with stream 115 to form the air or oxygen feed 104 to the combustor. In the alternative, stream 115 may be omitted and the entirety of the oxygen-containing feed to the combustor may be provided by the permeate stream 102.

As discussed previously, one of the additional benefits of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

The residue stream 110 resulting from the membrane sweep step 111 is reduced in carbon dioxide content to less than about 5 vol %, more preferably, to less than 4 vol %; and, most preferably, to less than 3 vol %. The residue stream 110 is typically discharged to the environment as treated flue gas.

The proportions of the flue gas that are directed to the carbon dioxide capture step and the sweep-based membrane separation step may be adjusted in conjunction with other operating parameters to tailor the processes of the invention to specific circumstances.

One of the goals of the process is to increase the carbon dioxide concentration in the feed stream to the carbon dioxide capture step, because amine scrubbing has capital and/or operating costs that scale with the concentration of the component to be captured. The membrane separation step preferentially permeates carbon dioxide and returns it to the combustor, thereby forming a loop between the combustor and the membrane unit in which the carbon dioxide concentration can build up.

The more exhaust gas that is directed to the membrane unit, in other words, the smaller the split ratio, the greater is the potential to increase the carbon dioxide concentration in the loop. However, the amount of membrane area needed will increase in proportion to the volume flow of gas directed to the membrane unit. Furthermore, most membrane materials have slight selectivity for oxygen over nitrogen, so a little oxygen from the air sweep stream will tend to counter-permeate to the feed side of the membranes and be lost in the residue stream. In consequence, the concentration of oxygen in the combustor may drop, giving rise to the possibility of incomplete combustion, coke formation on boiler components, or other problems. As illustrated by the calculations given in the Examples section below, we have discovered that trade-offs exist between the degree of carbon dioxide enrichment that can be obtained by the membrane separation steps, the amount of oxygen lost into the residue stream, and the membrane area and compression requirements to operate the membrane separation step.

In light of these trade-offs, we believe that it is preferable to operate the process at a split ratio of between 1:10 and 3:1. A split ratio of 1:1 means that splitter, 116, divides the total flue gas flow from the combustor into two equal portions by volume, so that 50 vol % passes to the carbon dioxide capture step and 50 vol % passes to the membrane separation step. Likewise, a split ratio of 1:10 means that 9 vol % passes to the carbon dioxide capture step and 91 vol % passes to the membrane separation step, and so on. More preferably, we prefer to operate at a split ratio between 1:4 and 2:1; that is, with between 20 vol % and 65 vol % of the exhaust being directed to the carbon dioxide capture step. We have discovered that operating in this range will provide a good balance between efficiency and costs for most processes.

The choice of the optimum split ratio will depend on many case-dependent factors. For example, a natural gas-fired, combined cycle power plant typically produces a flue gas that in certain cases may only contain 4-6 vol % carbon dioxide. This low carbon dioxide concentration makes capture of carbon dioxide for sequestration expensive. As shown in the Examples that follow, this concentration can be increased to 30 vol % (a six-fold increase) or more by using the membrane process with a large split ratio (1:5 or even 1:10). A large split ratio implies a large membrane area (capital cost) for unit 118 in FIG. 5, but this is offset by the smaller size of the carbon dioxide capture unit 113.

The invention is now further described by the following examples, which are intended to be illustrative of the invention, but are not intended to limit the scope or underlying principles in any way.

EXAMPLES

Example 1

Bases of Calculations for Other Examples (a) Membrane permeation experiments: The following calculations were performed using a composite membrane having a polyether-based selective layer with the properties shown in Table 1.

TABLE 1

| Gas | Permeance (gpu)* | $CO_2$/Gas Selectivity |
|---|---|---|
| Carbon dioxide | 1,000 | — |
| Nitrogen | 30 | 33 |
| Oxygen | 60 | 17 |
| Hydrogen | 100 | 10 |
| Water | 5,000** | — |

*Gas permeation unit; 1 gpu = 1 × $10^{-6}$ $cm^3$ (STP)/$cm^2$ · s · cmHg
**Estimated, not measured (b) Calculation methodology: All calculations were performed using a modeling program, ChemCad 5.6 (ChemStations, Inc., Houston, Tex.), containing code for the membrane operation developed by MTR's engineering group. For the calculations, all compressors and vacuum pumps were assumed to be 75% efficient. In each case, the modeling calculation was performed to achieve about 80-90% recovery of carbon dioxide from the flue gas stream.

To facilitate operation of the calculation software, for Examples 1 through 3, the base case air flow provided to the combustor via the membrane permeate side was assumed to be about 700 m$^3$/h (900 kg/h), compared with the typical air flow to a 500 MW coal-fired power plant of about 1.8 million m$^3$/h. In other words, the scale of the calculations for Examples 1 through 3 was about 1/2,400 the scale for a typical coal-fired power plant. This reduces membrane areas proportionately, but does not affect the relative flow rates or compositions of the streams involved.

Figure 2:
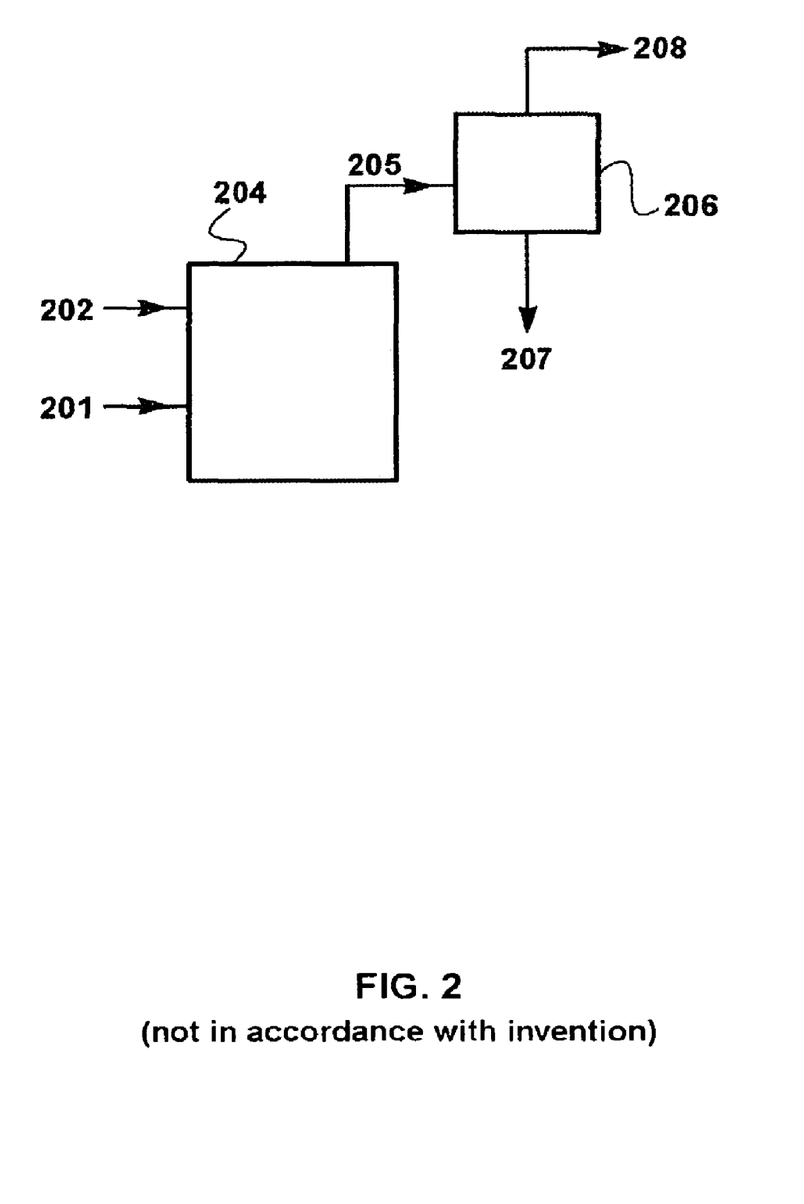
FIG. 2 is a schematic drawing of a flow scheme for a combustion process that does not include a sweep-based membrane separation step (not in accordance with the invention).

(c) "No membrane" example: A computer calculation was performed to determine the chemical composition of the off-gas streams from an amine plant used alone to treat the raw flue gas from a combustion process. FIG. 2 is a schematic drawing of a flow scheme for a combustion process that does not include a sweep-based membrane separation step.

Referring to FIG. 2, fuel stream 202 and air stream 201 are introduced into combustion step or zone 204. (The combustion step and the oxygen with which the fuel is combined are as described in the Detailed Description, above.)

Combustion exhaust stream 205 is withdrawn, then routed to an amine scrubbing plant 206. The chemical composition of the resulting off-gas streams, that is, the concentrated carbon dioxide stream 207 recovered from the amine regeneration step, and the unsorbed vent gas, 208, were then calculated. The results of this calculation are shown in Table 2.

TABLE 2

| | \multicolumn{5}{c|}{Stream} |
|---|---|---|---|---|---|
| | Air (201) | Coal (202) | Raw Flue Gas Feed to Amine Unit (205) | CO$_2$ Concentrate Stream (207) | Vent Gas Stream from Amine Unit (208) |
| Parameter | | | | | |
| Total Flow (kg/h) | 900 | 55 | 955 | 196 | 759 |
| Temperature (° C.) | 25 | 25 | 30 | 30 | 30 |
| Pressure (bar) | 1.0 | 1.0 | 1.0 | 1.0 | 1.0 |
| Component (vol %) | | | | | |
| Coal | 0 | 100.0 | 0 | 0 | 0 |
| Oxygen | 21.0 | 0 | 5.3 | 0.4 | 6.2 |
| Nitrogen | 79.0 | 0 | 77.9 | 2.6 | 90.9 |
| Carbon Dioxide | 0 | 0 | 14.0 | 91.3 | 0.7 |
| Water | 0 | 0 | 2.8 | 5.7 | 2.2 |

The amine plant treats a raw flue gas stream with a carbon dioxide concentration of 14 vol % and a total flow of 955 kg/h. The process recovers about 96% of the carbon dioxide content of the raw vent stream. The concentration of carbon dioxide in the non-sorbed exhaust stream from the scrubber is 0.7 vol %. Discharge of such a stream from a 500 MW power plant would release about 500 tons of carbon dioxide into the atmosphere per day.

Example 2

Serial Carbon Dioxide Capture/Membrane Sweep
(not in Accordance with the Invention)

Figure 3:
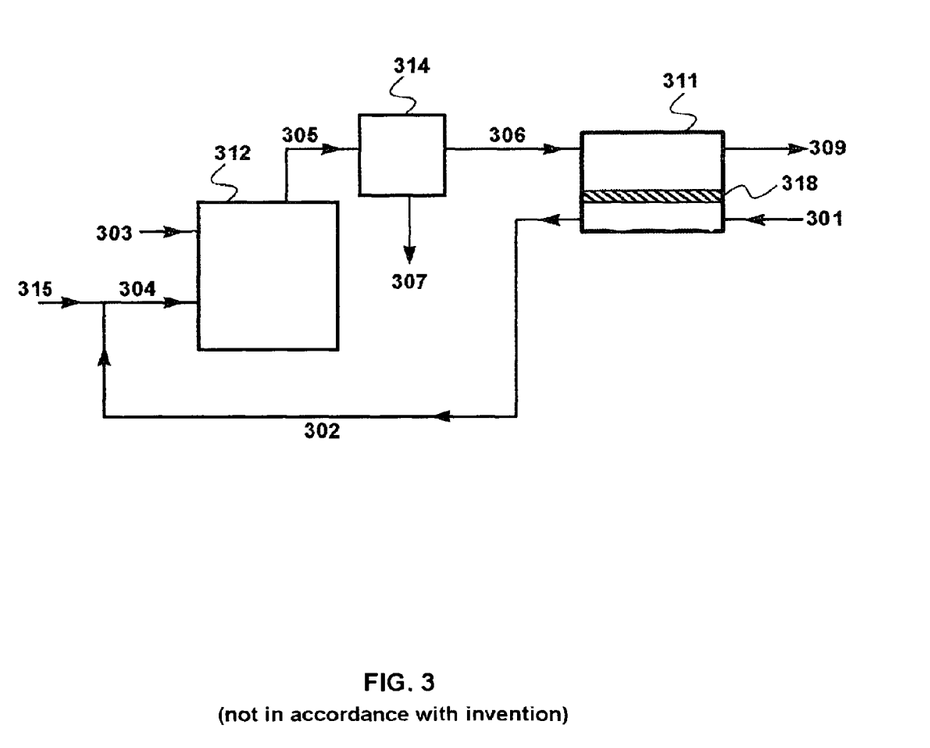
FIG. 3 is a schematic drawing of a flow scheme for a combustion process in which an amine-based carbon dioxide capture step and the sweep-based membrane separation step are performed in series, rather than in parallel (not in accordance with the invention).

A computer calculation was performed to determine the chemical composition of exhaust gas from a coal combustion process, where an amine-based carbon dioxide capture step and the membrane-based separation step are performed serially. FIG. 3 is a schematic drawing of a flow scheme for such a serial combustion process.

Referring to FIG. 3, coal 303 and air stream 304 are introduced into combustion step or zone 312. Stream 304 is made up of recycled exhaust stream 302 and additional air or oxygen supply stream 315.

Combustion exhaust stream 305 is withdrawn, then routed through a condenser (not shown), where water is knocked out of the stream. The dehydrated exhaust stream 305 is then routed to an amine scrubbing plant 314, where carbon dioxide-rich stream 307 is withdrawn, and carbon dioxide-depleted stream 306 is routed to a sweep-based membrane separation step. The membrane separation unit 311 contains membranes 318 that exhibit the properties shown in Table 1, above. Sweep stream 301 flows across the permeate side of the membrane at a flow rate of 900 kg/h. Exhaust stream 309 is released to the environment, and permeate stream 302 is routed back to the combustor 303.

The chemical composition of the gas stream 302 which is routed back to the combustor 312 was then calculated. The results of this calculation are shown in Table 3.

TABLE 3

| | \multicolumn{7}{c|}{Stream} |
|---|---|---|---|---|---|---|---|
| | Air (301) | Gas to Combustor (302) | Coal (303) | Flue Gas Feed to Amine Unit (305) | Membrane Feed (306) | CO$_2$ Concentrate Stream (307) | Membrane Residue Treated Flue Gas (309) |
| Parameter | | | | | | | |
| Total Flow (kg/h) | 900 | 913 | 55 | 960 | 756 | 204 | 743 |
| Temperature (° C.) | 25 | 29 | 25 | 30 | 30 | 30 | 25 |
| Pressure (bar) | 1.0 | 1.0 | 1.0 | 1.0 | 1.0 | 1.0 | 1.0 |
| Component (vol %) | | | | | | | |
| Coal | 0 | 0 | 100.0 | 0 | 0 | 0 | 0 |
| Oxygen | 21.0 | 18.9 | 0 | 3.6 | 4.3 | 0.2 | 6.3 |
| Nitrogen | 79.0 | 77.8 | 0 | 77.8 | 91.5 | 2.6 | 93.3 |
| Carbon Dioxide | 0 | 0.4 | 0 | 14.3 | 6.7 | 88.9 | 0.2 |
| Water | 0 | 2.9 | 0 | 4.3 | 3.5 | 8.3 | 0.1 |

The carbon dioxide-rich stream 307 withdrawn from the amine scrubbing step 314 contains a carbon dioxide concentration of 88.9 vol %, and the membrane feed stream 306 coming from the amine scrubbing step contains a carbon dioxide concentration of 6.7 vol %. The gas stream 302 that is recycled to the combustor contains a very low concentration of carbon dioxide at 0.4 vol %, and a relatively high oxygen concentration at 18.9 vol %. The process recovers about 99% of the carbon dioxide content of the raw vent stream. The concentration of carbon dioxide in the exhaust stream is 0.2 vol %. Discharge of such a stream from a 500 MW power plant would release about 150 tons of carbon dioxide into the atmosphere per day. The load on the amine scrubber is increased slightly compared with the "no-membrane" case of Example 1, to 960 kg/h.

Example 3

Process of the Invention

The calculations for this Example were performed using the flow scheme shown in FIG. 1 and described in the Detailed Description, above. This flow scheme includes an amine scrubbing step 113 performed in parallel with a sweep-based membrane separation step 111.

In this set of calculations, the membrane area was assumed to be 700 m², and the combustion exhaust stream split was set at 1:1 (flow to carbon dioxide capture step:flow to sweep-based membrane separation step). Air flow 101 is 900 kg/h. The results of this calculation are shown in Table 4.

Example 4

Treatment of Flue Gas from Combined Cycle Gas-Fired Plant by Amine Scrubbing Only (not in Accordance with the Invention)

Figure 4:
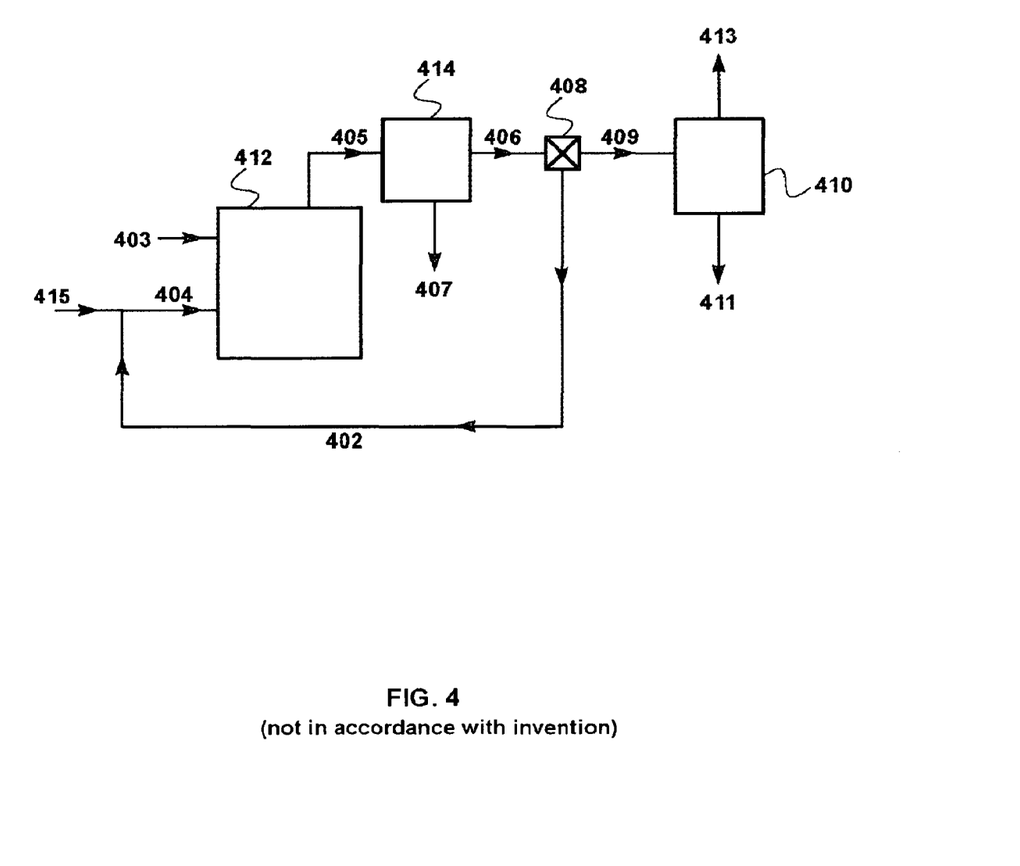
FIG. 4 is a schematic drawing of a flow scheme for a combustion process in which a portion of the combustion exhaust stream is routed to an amine scrubbing plant and the other portion is routed back to the combustor (not in accordance with the invention).

A computer calculation was performed to determine the chemical composition of exhaust gas from a natural gas combustion process, where an amine-based carbon dioxide capture step is performed, but no sweep-based membrane separation step is used. It was assumed that a portion of the exhaust gas from the combustor was recirculated to the combustion step as a diluent for temperature control. FIG. 4 is a schematic drawing of a flow scheme for such a combustion process.

To facilitate operation of the calculation software, for Examples 4 through 7, the base case air flow provided to the combustor via the membrane permeate side was assumed to be about 975 m³/h (1,250 kg/h), compared with the typical air flow to a 500 MW power plant of about 1.8 million m³/h. In other words, the scale of the calculation for Examples 4 though 7 was about 1/1,200 of the scale for a typical natural gas-fired power plant. This reduces membrane area proportionately, but does not affect the relative flow rates or compositions of the streams involved.

Referring to FIG. 4, natural gas 403 and air stream 404 are introduced into combustion step or zone 412. Stream 404 is made up of recycled exhaust stream 402 and additional air or oxygen supply stream 415.

Combustion exhaust stream 405 is withdrawn, then routed through a condenser 414, where water 407 is knocked out of the stream. The dehydrated exhaust stream 406 is then routed

TABLE 4

| | Stream | | | | | | | |
|---|---|---|---|---|---|---|---|---|
| | Air (101) | Gas to Combustor (102) | Coal (103) | Amine Plant Feed (106) | $CO_2$ Concentrate Stream (107) | Vent Gas From Amine Unit (108) | Membrane Feed (109) | Membrane Residue Treated Flue Gas (110) |
| Parameter | | | | | | | | |
| Total Flow (kg/h) | 900 | 1,073 | 55 | 561 | 180 | 372 | 561 | 378 |
| Temperature (° C.) | 25 | 28 | 25 | 30 | 30 | 25 | 30 | 25 |
| Pressure (bar) | 1.0 | 1.0 | 1.0 | 1.0 | 1.0 | 1.0 | 1.0 | 1.0 |
| | | | | Component (vol %) | | | | |
| Coal | 0 | 0 | 100 | 0 | 0 | 0 | 0 | 0 |
| Oxygen | 21.0 | 16.5 | 0 | 2.3 | 0 | 2.1 | 2.3 | 7.4 |
| Nitrogen | 79.0 | 70.1 | 0 | 70.7 | 0.1 | 92.0 | 70.7 | 91.8 |
| Carbon Dioxide | 0 | 11.3 | 0 | 23.4 | 99.6 | 0.3 | 23.4 | 0.8 |
| Water | 0 | 2.1 | 0 | 4.3 | 0.4 | 5.5 | 4.3 | 0 |

The carbon dioxide-rich stream 107 from the amine scrubbing step contains 99.6 vol % carbon dioxide. The stream 102 that is routed back to the combustor contains 11.3 vol % carbon dioxide and 16.5 vol % oxygen. The process recovers about 96.5 vol % of the carbon dioxide content of the raw vent stream. The concentration of carbon dioxide in the off-gas stream from the amine unit is 0.3 vol % and in the membrane residue stream is 0.8 vol %. Discharge of both streams from 500 MW power plant would release about 380 tons of carbon dioxide into the atmosphere per day, and the volume of gas sent to the amine plant is cut in half.

to a splitter 408, from which a first portion 409 of the exhaust stream is routed to an amine scrubbing plant 410, where carbon dioxide-rich stream 411 is withdrawn, and carbon dioxide-depleted stream 413 is routed to the environment as treated flue gas. The other portion 402 of the exhaust stream is routed back to the combustor 412 as stream 402. In this example, the split ratio was 3:2, meaning that 60 vol % of the exhaust stream was routed to the amine-based carbon dioxide capture step 410 and the remaining 40 vol % of the exhaust stream was routed back to the combustor 412.

The chemical composition of the gas stream 402 which is routed back to the combustor 412 was then calculated. The results of this calculation are shown in Table 5.

TABLE 5

| | Stream | | | | | | |
|---|---|---|---|---|---|---|---|
| | Air (415) | Gas to Combustor (402) | Methane (403) | Flue Gas (406) | Amine Plant Feed (409) | $CO_2$ Concentrate Stream (411) | Vent Gas From Amine Unit (413) |
| Parameter | | | | | | | |
| Total Flow (kg/h) | 1,250 | 800 | 55 | 2,013 | 1,213 | 151 | 1,062 |
| Temperature (° C.) | 25 | 30 | 25 | 30 | 30 | 30 | 30 |
| Pressure (bar) | 1.0 | 1.0 | 10.0 | 1.0 | 1.0 | 1.0 | 1.0 |
| Component (vol %) | | | | | | | |
| Methane | 0 | 0 | 100 | 0 | 0 | 0 | 0 |
| Oxygen | 21.0 | 5.4 | 0 | 5.4 | 5.4 | 0.6 | 5.8 |
| Nitrogen | 79.0 | 82.1 | 0 | 82.1 | 82.1 | 1.0 | 89.5 |
| Carbon Dioxide | 0 | 8.2 | 0 | 8.2 | 8.2 | 98.2 | 0.09 |
| Water | 0 | 4.3 | 0 | 4.3 | 4.3 | 0.2 | 4.6 |

The carbon dioxide-rich stream 411 withdrawn from the amine scrubbing step 410 contains a carbon dioxide concentration of 98.2 vol %, and recovers essentially all of the carbon dioxide from the combustor. The gas stream 402 that is recycled to the combustor contains 8.2 vol % carbon dioxide and 5.4 vol % oxygen concentration.

Example 5

Process of the Invention Treating Flue Gas from Combined Cycle Gas-Fired Plant

The calculations for this Example were performed using the flow scheme shown in FIG. 1 and described in the Detailed Description, above. This flow scheme includes an amine scrubbing step 113 performed in parallel with a sweep-based membrane separation step 111.

In this set of calculations, the membrane area was assumed to be 2,800 m², and the combustion exhaust stream split was set at 1:5 (flow to carbon dioxide capture step:flow to sweep-based membrane separation step), these parameters being set to achieve about 90 vol % carbon dioxide recovery. Air flow 101 is 1,250 kg/h. The results of this calculation are shown in Table 6.

concentrations of both carbon dioxide and oxygen, at 24.4 and 12.3 vol %, respectively. The flue gas 110 that is released to the environment contains 1.2 vol % carbon dioxide.

The concentration of carbon dioxide in the feed stream to the amine unit is about 32 vol %, compared with only 8 vol % in Example 4. The flow of gas routed to the amine plant is cut to from about 1,200 kg/h to 304 kg/h, which would cut the required capacity of the amine plant to about a quarter of the corresponding prior art requirement.

Example 6

Treatment of Flue Gas from Combined Cycle Gas-Fired Plant by Amine Scrubbing at Pressure (not in Accordance with the Invention)

A computer calculation was performed to determine the chemical composition of exhaust gas from a natural gas combustion process, where an amine-based carbon dioxide capture step is performed, but no sweep-based membrane separation step is used. The calculation differs from that of Example 4 in that the exhaust gas was assumed to be compressed to 10 bar before being routed to the amine scrubbing

TABLE 6

| | Stream | | | | | | | |
|---|---|---|---|---|---|---|---|---|
| | Air (101) | Gas to Combustor (102) | Methane (103) | Amine Plant Feed (106) | $CO_2$ Conc. Stream (107) | Vent Gas From Amine Unit (108) | Membrane Feed (109) | Membrane Residue Treated Flue Gas (110) |
| Parameter | | | | | | | | |
| Total Flow (kg/h) | 1,250 | 1,884 | 55 | 304 | 129 | 175 | 1,520 | 864 |
| Temperature (° C.) | 25 | 29 | 25 | 30 | 30 | 30 | 30 | 25 |
| Pressure (bar) | 1.0 | 1.0 | 10.0 | 1.0 | 1.0 | 1.0 | 1.0 | 1.0 |
| Component (vol %) | | | | | | | | |
| Methane | 0 | 0 | 100 | 0 | 0 | 0 | 0 | 0 |
| Oxygen | 21.0 | 12.3 | 0 | 7.1 | 0.02 | 1.0 | 7.1 | 6.1 |
| Nitrogen | 79.0 | 59.9 | 0 | 63.1 | 0.2 | 92.3 | 63.1 | 92.8 |
| Carbon Dioxide | 0 | 24.4 | 0 | 31.9 | 99.7 | 0.5 | 31.9 | 1.2 |
| Water | 0 | 0.3 | 0 | 4.3 | 0.04 | 6.2 | 4.3 | 0 |

Figure 5:
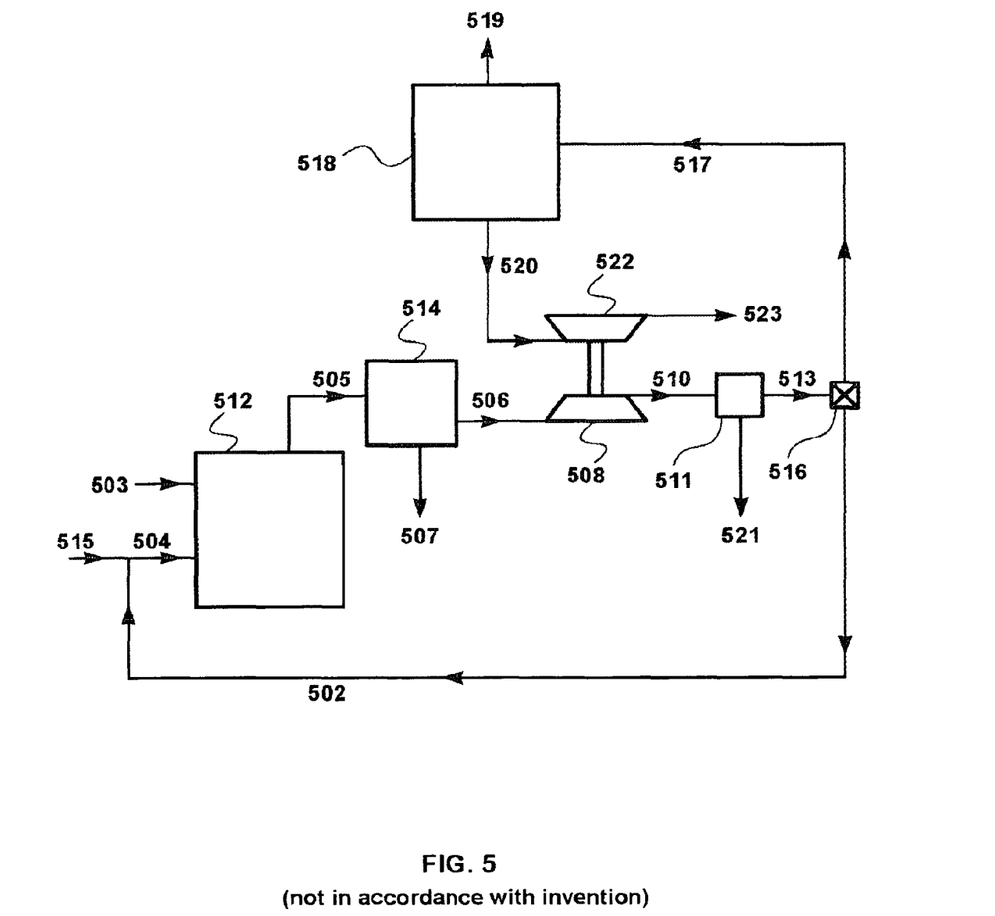
FIG. 5 is a schematic drawing of a flow scheme for a combustion process in which the combustion exhaust stream is compressed and a portion of the compressed stream is routed to an amine scrubbing plant, and the other portion is routed back to the combustor. The compressed nitrogen-rich exhaust stream from the amine scrubbing process is then routed back to provide power to the compressor (not in accordance with the invention).

The carbon dioxide-rich stream 107 from the amine scrubbing step contains 99.7 vol % carbon dioxide. The stream 102 that is routed back to the combustor contains relatively high plant. In a combined cycle plant, the air coming into the combustor is normally compressed to high pressure, such as 10 bar or more. Compressing the exhaust gas means that diluent gas diverted from the flue gas stream to be recycled to the combustor will be at high pressure, and may be returned without recompression, thereby saving on the compressor capacity used in the combustion/power generation steps. The amine plant is also operated at pressure. FIG. 5 is a schematic drawing of a flow scheme for such a combustion process.

Referring to FIG. 5, natural gas 503 and air stream 504 are introduced into combustion step or zone 512. Stream 504 is made up of recycled exhaust stream 502 and additional air or oxygen supply stream 515.

Combustion exhaust stream 505 is withdrawn, then routed through a condenser 514, where water 507 is knocked out of the stream. The dehydrated exhaust stream 506 is then routed to a compressor 508, where it is compressed to 10 bar. The compressed exhaust stream 510 passes through aftercooler/separator 511, yielding water stream, 521, and compressed stream, 513. Stream 513 then passes to splitter 516, from which a first portion 517 of the exhaust stream is routed to an amine scrubbing plant 518, which operates under pressure to produce carbon dioxide-rich stream 519, which is withdrawn, and compressed nitrogen-rich off-gas stream, 520. This stream remains at pressure and is routed to turbo-expander, 522, which is linked in power-transferring relationship to compressor, 508. A substantial portion of the power required to drive compressor 508 can be generated in this way.

The other portion 502 of the exhaust stream is routed back to the combustor 512 as stream 502. This stream remains at 10 bar, so it can be returned at essentially this pressure to the combined cycle combustion/power generation step. In this example, 60 vol % of the exhaust stream was routed to the amine scrubbing step, 518, and the remaining 40 vol % of the exhaust stream was routed back to the combustor 512.

The chemical composition of the gas stream 502 which is routed back to the combustor 512 was then calculated. The results of this calculation are shown in Table 7.

Example 7

Figure 6:
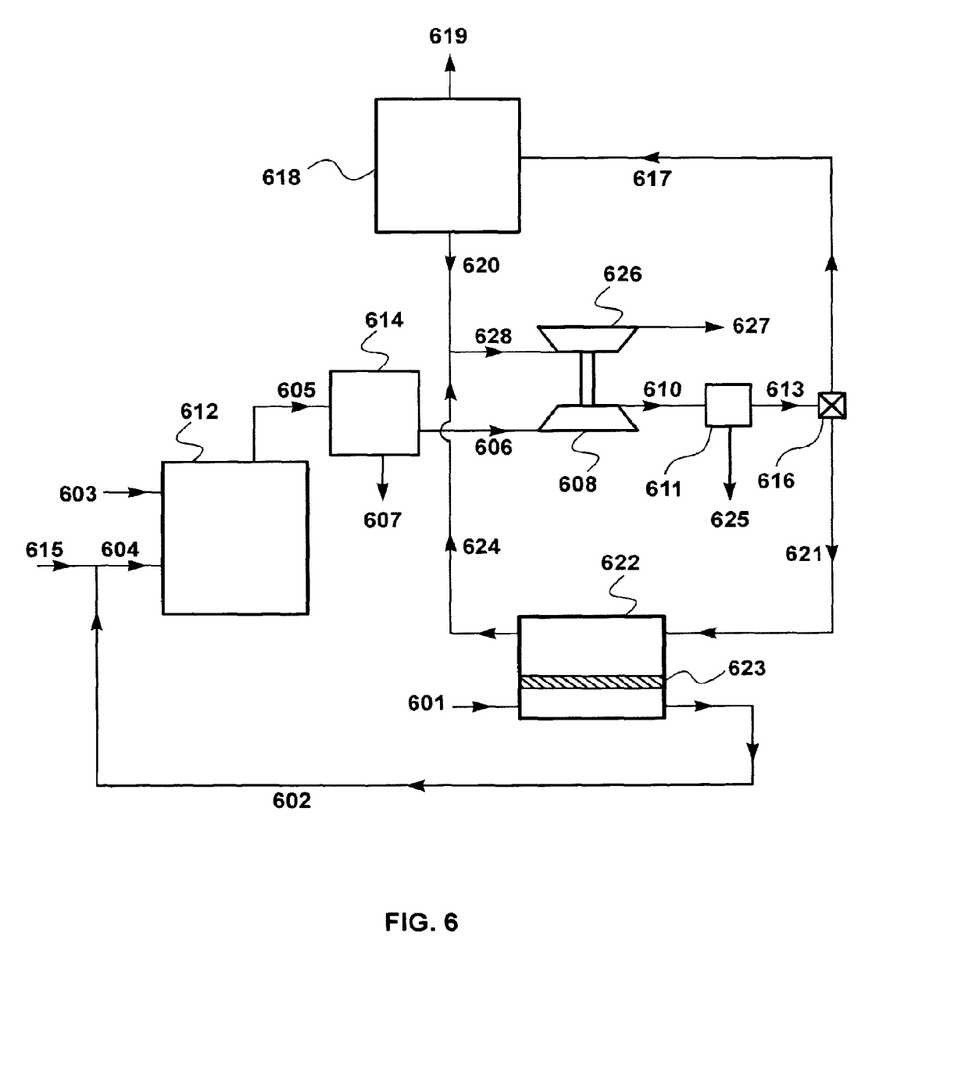
FIG. 6 is a schematic drawing of a flow scheme for a combustion process in accordance with the invention in which the combustion exhaust stream is compressed and a portion of the compressed stream is routed to an amine scrubbing plant, and the other portion is routed to a sweep-based membrane separation step. The sweep stream from the membrane separation step is then routed back to the combustor.

Process of the Invention Treating Flue Gas from Combined Cycle Gas-Fired Plant at Pressure A computer calculation was performed to determine the chemical composition of exhaust gas from a natural gas combustion process, where an amine-based carbon dioxide capture step and sweep-based membrane separation step are performed in parallel. The calculation differs from that of Example 5 in that the exhaust gas was assumed to be compressed to 10 bar, as in Example 6. As discussed above, in a combined cycle plant, the air coming into the combustor is normally compressed to high pressure, such as 10 bar or more. Compressing the exhaust gas means that diluent gas diverted from the flue gas stream to be recycled to the combustor will be at high pressure, and may be returned without recompression, thereby saving on the compressor capacity used in the combustion/power generation steps. The amine plant is also operated at pressure. FIG. 6 is a schematic drawing of a flow scheme for such a combustion process.

Referring to FIG. 6, natural gas 603 and air stream 604 are introduced into combustion step or zone 612. Stream 604 is made up of recycled exhaust stream 602 and additional air or oxygen supply stream 615.

Combustion exhaust stream 605 is withdrawn, then routed through a condenser 614, where water 607 is knocked out of the stream. The dehydrated exhaust stream 606 is then routed to a compressor 608, where it is compressed to 10 bar. The compressed exhaust stream 610 passes through aftercooler/separator 611, yielding water stream 625. Stream 613 passes to splitter 616, from which a first portion 617 of the exhaust stream is routed to an amine scrubbing plant 618, which operates under pressure to produce carbon dioxide-rich

TABLE 7

| | Stream | | | | | |
|---|---|---|---|---|---|---|
| | | | | Amine | $CO_2$ | Vent Gas |
| | Gas to | | Flue | Plant | Concentrate | From Amine |
| Air | Combustor | Methane | Gas | Feed | Stream | Unit |
| (515) | (502) | (503) | (506) | (517) | (519) | (520) |

| Parameter | | | | | | | |
|---|---|---|---|---|---|---|---|
| Total Flow (kg/h) | 1,250 | 800 | 55 | 2,013 | 1,213 | 151 | 1,062 |
| Temperature (° C.) | 25 | 30 | 25 | 30 | 30 | 30 | 30 |
| Pressure (bar) | 1.0 | 10.0 | 10.0 | 1.0 | 10.0 | 10.0 | 10.0 |
| Component (vol %) | | | | | | | |
| Methane | 0 | 0 | 100 | 0 | 0 | 0 | 0 |
| Oxygen | 21.0 | 5.4 | 0 | 5.4 | 5.4 | 0.6 | 5.8 |
| Nitrogen | 79.0 | 82.1 | 0 | 82.1 | 82.1 | 1.0 | 89.5 |
| Carbon Dioxide | 0 | 8.2 | 0 | 8.2 | 8.2 | 98.2 | 0.09 |
| Water | 0 | 4.3 | 0 | 4.3 | 4.3 | 0.2 | 4.6 |

The carbon dioxide-rich stream 519 withdrawn from the amine scrubbing step 518 contains a carbon dioxide concentration of 98.2 vol %. The gas stream 502 that is recycled to the combustor contains a relatively low concentration of carbon dioxide at 8.2 vol %, and an oxygen concentration of 5.4 vol %.

stream 619, which is withdrawn, and compressed nitrogen-rich off-gas stream, 620. This stream remains at pressure and is routed to turbo-expander, 626, which is linked in power-transferring relationship to compressor, 608. A substantial portion of the power required to drive compressor 608 can be generated in this way.

The other portion 621 of the exhaust stream is routed to a sweep-based membrane separation step 622. Membrane unit 622 contains membranes 623 which exhibit a high permeance for carbon dioxide, as well as high selectivity for carbon dioxide over nitrogen. The second portion 621 of the compressed, condensed exhaust stream 621 flows across the feed side of the membranes; a sweep gas of air, 601 flows across the permeate side. The sweep stream picks up the preferentially permeating carbon dioxide, and the resulting permeate stream 602 is withdrawn from the membrane unit and is combined with stream 615 to form the air or oxygen feed 604 to the combustor. The nitrogen-rich exhaust stream 624 from the membrane separation step 622 remains at pressure and is combined with the off-gas stream 620 from the amine scrubbing step to form stream 628, which is then routed to the turbo-expander, 626, to provide power to drive compressor 608. The resulting treated flue gas stream 627 is released to the environment.

In this example, about 17 vol % of the exhaust stream was routed to the amine-based carbon dioxide capture step 618 and the remaining 83 vol % of the exhaust stream was routed to the sweep-based membrane separation step 622.

The chemical composition of the gas stream 602 which is routed back to the combustor 612 was then calculated. The results of this calculation are shown in Table 8.

TABLE 8

| | Stream | | | | | | | |
|---|---|---|---|---|---|---|---|---|
| | Air (601) | Gas to Combustor (602) | Methane (603) | Amine Plant Feed (617) | $CO_2$ Conc. Stream (619) | Vent Gas From Amine Unit (620) | Membrane Feed (621) | Membrane Residue Treated Flue Gas (624) |
| Parameter | | | | | | | | |
| Total Flow (kg/h) | 1,250 | 2,163 | 55 | 349 | 148 | 202 | 1,746 | 833 |
| Temperature (° C.) | 25 | 27 | 25 | 30 | 30 | 30 | 30 | 25 |
| Pressure (bar) | 1.0 | 1.0 | 10.0 | 10.0 | 10.0 | 10.0 | 10.0 | 10.0 |
| Component (vol %) | | | | | | | | |
| Methane | 0 | 0 | 100 | 0 | 0 | 0 | 0 | 0 |
| Oxygen | 0 | 14.5 | 0 | 4.4 | 0.2 | 6.4 | 4.4 | 6.0 |
| Nitrogen | 79.0 | 59.7 | 0 | 62.9 | 0.2 | 92.5 | 62.9 | 93.8 |
| Carbon Dioxide | 21.0 | 25.4 | 0 | 32.2 | 99.7 | 0.5 | 32.2 | 0.13 |
| Water | 0 | 0.4 | 0 | 0.4 | 0 | 0.7 | 4.5 | 0 |

The carbon dioxide-rich stream 619 from the amine scrubbing step contains 99.7 vol % carbon dioxide. The stream 602 that is routed back to the combustor contains relatively high concentrations of both carbon dioxide and oxygen, at 25.4 and 14.5 vol %, respectively. The flue gas 627 that is released to the environment—which is a combination of streams 620 and 624—contains 0.2 vol % carbon dioxide.

The concentration of carbon dioxide in the feed stream to the amine unit is about 32 vol %, compared with only 8 vol % in Example 6. The flow of gas routed to the amine plant is cut from about 1,200 kg/h to 349 kg/h, which would cut the required capacity of the amine plant to slightly more than a quarter of the corresponding prior art requirement.

We claim:

1. A process for controlling carbon dioxide exhaust from a combustion process, comprising:
   (a) performing a combustion process by combusting a mixture of a fuel and air, oxygen-enriched air, or oxygen, thereby creating an exhaust stream comprising carbon dioxide and nitrogen;
   (b) performing an absorption step to remove a portion of carbon dioxide in concentrated form from a first portion of the exhaust stream, thereby creating an off-gas stream from the capture step that is less concentrated in carbon dioxide than the exhaust stream;
   (c) providing a membrane having a feed side and a permeate side, and being selectively permeable to carbon dioxide over nitrogen and to carbon dioxide over oxygen;
   (d) passing a second portion of the exhaust stream across the feed side;
   (e) passing air, oxygen-enriched air or oxygen as a sweep stream across the permeate side;
   (f) withdrawing from the feed side a carbon-dioxide depleted vent stream;
   (g) withdrawing from the permeate side a permeate stream comprising oxygen and carbon dioxide;
   (h) passing the permeate stream to step (a) as at least part of the air, oxygen-enriched air, or oxygen used in step (a).

2. The process of claim 1, wherein the exhaust stream comprises flue gas from a coal-fired power plant.

3. The process of claim 1, wherein the exhaust stream comprises flue gas from a gas-fired power plant.

4. The process of claim 1, wherein the exhaust stream comprises at least 20 vol % $CO_2$.

5. The process of claim 4, wherein the exhaust stream comprises at least 25 vol % $CO_2$.

6. The process of claim 1, wherein, the exhaust stream comprises at least 3 vol % oxygen.

7. The process of claim 1, wherein the first portion of the exhaust stream comprises between about 10 vol % and about 75 vol % of the exhaust stream.

8. The process of claim 7, wherein the first portion of the exhaust stream comprises between about 20 vol % and about 65 vol % of the exhaust stream.

9. The process of claim 1, wherein the second portion of the exhaust stream is compressed to a pressure of up to about 5 bar before being passed across the feed side of the membrane.

10. The process of claim 1, wherein the exhaust stream is compressed prior to steps (b) and (d).

11. The process of claim 1, wherein the membrane exhibits a carbon dioxide permeance of at least 500 gpu under process operating conditions.

12. The process of claim 1, wherein the membrane exhibits a selectivity in favor of carbon dioxide over nitrogen of at least 10 under process operating conditions.

13. The process of claim 1, wherein the vent stream comprises 3 vol % carbon dioxide or less.

14. The process of claim 13, wherein the vent stream comprises 2 vol % carbon dioxide or less.

15. The process of claim 1, wherein the membrane comprises two or more membranes, and the two or more membranes are arranged in one or more modules, and wherein the one or more modules are arranged in a vertical configuration.

16. The process of claim 1, wherein the absorption step comprises a chemical absorption process.

17. The process of claim 16, wherein the chemical absorption process is amine scrubbing.

18. The process of claim 16, wherein the absorption step comprises absorption using a reagent comprising ammonia.

19. The process of claim 1, wherein the absorption step comprises a physical absorption process.

20. The process of claim 1, wherein the absorption step comprises an activated hot potassium carbonate process.

* * * * *